May 17, 1927.  H. F. ROHRKE  1,629,309

SANITARY CREAM SAVER

Filed Nov. 22, 1926

Inventor
H. F. Rohrke,
By
Attorney

Patented May 17, 1927.

1,629,309

UNITED STATES PATENT OFFICE.

HUGO F. ROHRKE, OF ANSLEY, NEBRASKA.

SANITARY CREAM SAVER.

Application filed November 22, 1926. Serial No. 150,055.

The invention relates to a sanitary cream saver.

The object of the present invention is to provide a simple, practical, and efficient sanitary device of strong, durable and comparatively inexpensive construction, designed for separating the cream in a milk bottle from the milk thereof and capable of being readily introduced into a milk bottle without causing any material mixing of the cream and the milk and enabling the cream to be readily poured off without removing any of the milk.

A further object of the invention is to provide a sanitary device of this character which will not require hinge joints, nuts, washers, and similar fastening devices which gather milk or cream and render removal thereof difficult, and thereby impair the sanitary character of the device by the souring of such lacteal accumulation.

It is also an object of the invention to provide a cream separating device adapted to be easily manipulated for breaking the suction of the device at the top of the milk to permit the latter to be readily poured out of the milk bottle after the cream has been removed.

Another object of the invention is to provide a cream separating device equipped with means for enabling the cream top of a bottle or jar of milk to be readily removed.

With these and other objects in view, the invention consists in the construction and novel combination and arrangement of parts hereinafter fully described, illustrated in the accompanying drawings and pointed out in the claims hereto appended, it being understood that various changes in the form, proportion and minor details of construction, within the scope of the claims, may be resorted to without departing from the spirit or sacrificing any of the advantages of the invention.

Figure 1:
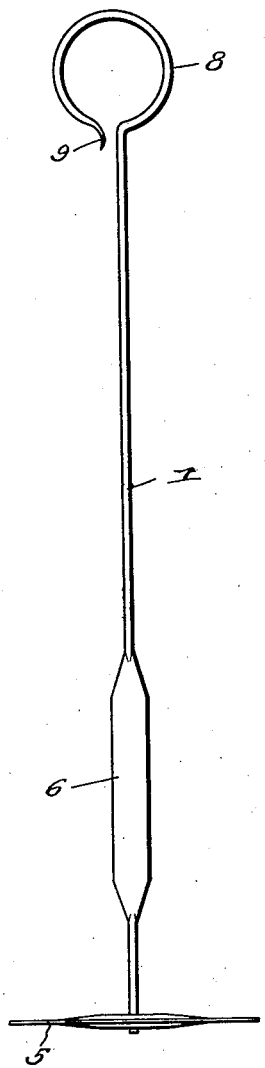
Figure 1 is a front elevation of a sanitary cream saver constructed in accordance with this invention.
Figure 2:
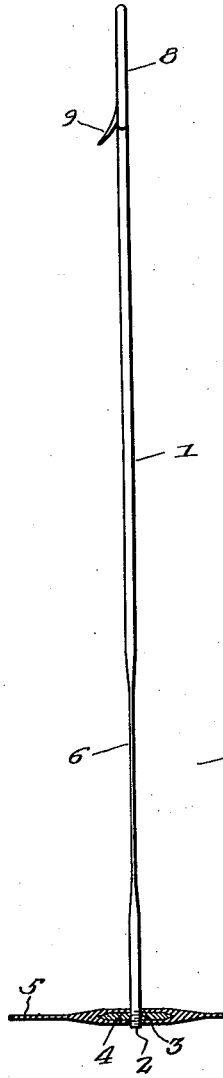
Fig. 2 is a side elevation, partly in section, of the same.

In the accompanying drawings, in which is illustrated the preferred embodiment of the invention, the sanitary cream saver comprises in its construction a rod or stem 1 which is round in cross section and which has a lower threaded end 2 screwed into a threaded opening 3 of a hard rubber disc 4 carried by a thin circular flexible disc 5. The flexible disc 5 is constructed of soft rubber and the central disc 4 is constructed of hard vulcanized rubber and is embedded within the central portion of the soft rubber disc 5, the soft rubber being molded around the hard rubber disc 4 and completely covering the same at the upper and lower faces thereof, as clearly illustrated in Fig. 2 of the drawing. The hard rubber disc is preferably tapered in thickness at its periphery, as shown, and the soft rubber disc 5 is slightly thickened at its lower portion where it is molded around the central threaded disk 4. This obviates the necessity of employing separate washers and nuts for securing the soft flexible disc to the lower end of the stem 1. The soft flexible disc with its hard central core or disc 4 is adapted to be readily screwed on or off the lower end of the stem, for packing, washing or other purposes. Also, there is no liability of milk or cream collecting under washers or nuts and souring and thereby rendering the device insanitary.

Figure 3:
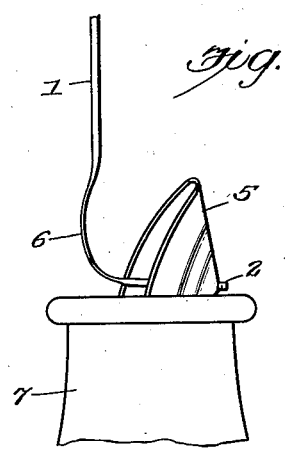
Fig. 3 is an elevation illustrating the manner of introducing the device into a milk bottle and removing the cream.
Figure 4:
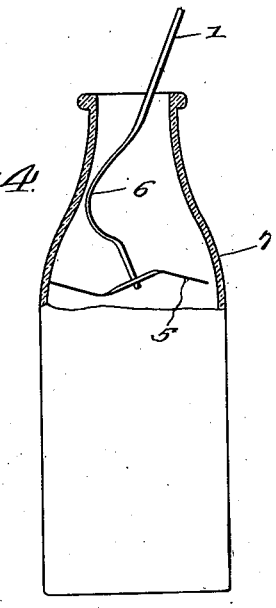
Fig. 4 is a vertical sectional view showing the manner of breaking the suction on the device after the removal of the cream.
Figure 5:
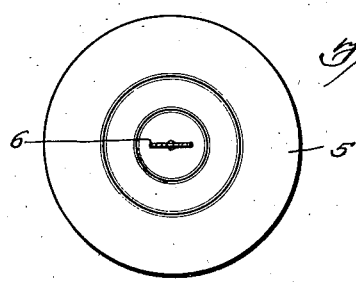
Fig. 5 is a plan view of the device, the spring being in section.

The rod or stem has a flattened intermediate portion 6 forming an integral relatively thin longitudinally disposed spring which is adapted to be readily flexed, as illustrated in Fig. 3 of the drawing, to permit the introduction of the device into a milk bottle 7, as clearly illustrated in Fig. 3 of the drawing and to enable the suction below the disc to be broken, as clearly shown in Fig. 4 of the drawing. The thin integral spring which connects the upper and lower portions of the stem enables the disc to be turned to a position at right angles to its normal position without necessitating the employment of hinges or similar fastening means, and there will be no liability of milk or cream collecting and settling in a hinge joint and thereby rendering the device insanitary.

The circular highly flexible disc 5 has a diameter equal to the diameter of the interior of the bottle 7 at the cream line, which is generally the full interior diameter of the bottle or jar. The thin flexible rubber disc is adapted to be partially folded or curved transversely to introduce it edgewise into the milk bottle to avoid disturbing the cream, as illustrated in Fig. 3 of the drawing, and the thin resilient integral spring portion 6 of the stem permits the latter to be flexed to arrange the disc at right angles to its normal position, thereby avoiding the necessity of providing a hinge joint for this purpose. This not only prevents any liability of milk or cream accumulating and souring at a hinge joint and causing more or less trouble to sterilize the device, but it also avoids the expense of providing a hinge joint and at the same time results in the production of a superior device in that the spring connection is more durable than a hinge joint. Also the spring connection has the function of automatically returning the disc to its normal position at right angles to the stem after the disc has been introduced into the bottle and passed through the cream portion thereof and has reached the interior of the bottle at the cream line. As soon as the disc is free to assume its normal position with relation to the stem the spring will operate to carry it from the position shown in Fig. 3 of the drawing to a horizontal position.

When the disc has assumed a horizontal position at the cream line it separates the cream from the milk and the cream is adapted to be poured out of the milk bottle without the removal of any of the milk, and all of the cream may be saved. After the cream has been poured off the milk, the suction between the disc and the milk may be readily broken by pushing the stem to one side of the bottle and pressing downward on the stem, which through the action of the spring will cause the disc to separate itself from the bottle at the periphery by a simple bending or flexing of the disc. This will result in withdrawing the edge from the interior wall of the bottle at one side and will break the suction and enable the device to be easily and quickly removed or a portion of the milk poured off as desired. In practice, the stem will be made of fine spring steel and the flattened portion 6 will result in a fine steel spring which will not only dispense with the hinge joint heretofore employed for enabling the disc to be arranged at right angles to the stem, but it will also automatically operate the disc in returning the same to its normal horizontal position and in breaking the suction after the cream has been poured off.

The stem is provided with a handle or finger loop 8 of circular form having a laterally extended pointed terminal 9 diverging from the plane of the loop and adapted to readily penetrate a milk bottle top for enabling the same to be easily removed from a milk bottle. By placing the finger loop or handle in a horizontal position upon a milk bottle, the projecting terminal portion 9 may be readily caused to pierce the milk bottle top and the stem may then be operated as a lever for lifting the top without causing any splashing of the milk or cream.

I claim:

1. A sanitary cream saver comprising a flexible disc adapted to be inserted in a bottle or other receptacle, and a stem connected at the lower end to the disc and provided with a spring constituting a portion of the length of the stem and permitting the stem to be flexed to arrange the disc at an angle to its normal position and capable also of automatically returning the disc to its normal position after the same has been introduced into a receptacle.

2. A sanitary cream saver comprising a flexible disc adapted to be inserted in a bottle or other receptacle, and a stem connected at its lower end to the disc and provided with an integral reduced portion forming a spring and permitting the stem to be flexed to arrange the disc at an angle to its normal position to permit the disc to be inserted edgewise into a receptacle.

3. A sanitary cream saver comprising a flexible disc adapted to be inserted in a bottle or other receptacle, and a stem connected at its lower end to the disc and provided above the same with a flattened portion forming an integral spring adapted to be flexed to permit the disc to be arranged at an angle to its normal position for introducing the disc edgewise into a receptacle and for causing the flexing of the spring within a bottle, being adapted to flex the disc and break the suction between the disc and the liquid below it.

4. A sanitary cream saver including a flexible disc provided with a centrally arranged core embedded within the disc and having a threaded opening, and a stem having a threaded lower end screwed into the threaded opening of the said core.

5. A sanitary cream saver comprising a flexible rubber disc provided with a core of hard vulcanized rubber completely embedded within the central portion of the flexible disc and provided with a threaded opening, and a stem having a threaded lower end secured into the opening of the core.

In testimony whereof I have hereunto set my hand.

HUGO F. ROHRKE.